Figure 1:
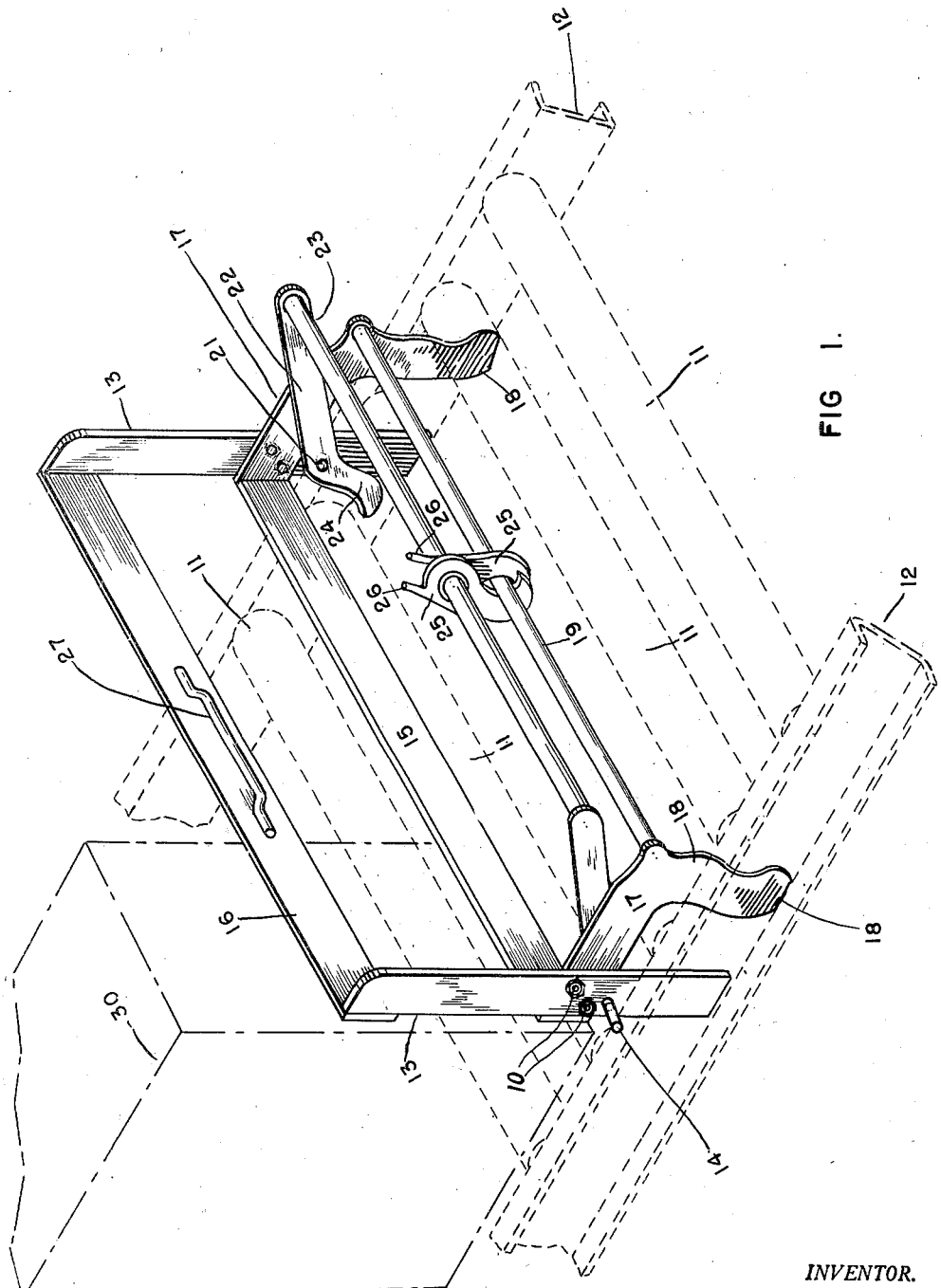

March 8, 1949. F. L. GRIFFITH 2,463,532
BARRIER STRUCTURE FOR ROLLERWAYS
Filed Nov. 23, 1945 2 Sheets-Sheet 2

INVENTOR.
FORREST L. GRIFFITH
BY William D. Hall
ATTORNEY

Patented Mar. 8, 1949

2,463,532

UNITED STATES PATENT OFFICE 2,463,532

BARRIER STRUCTURE FOR ROLLER WAYS

Forrest Lee Griffith, Baltimore, Md., assignor to the United States of America as represented by the Secretary of War Application November 23, 1945, Serial No. 630,514

3 Claims. (Cl. 193—35)

(Granted under the act of March 3, 1883, as amended April 30, 1928; 370 O. G. 757)

The invention described herein may be manufactured and used by or for the Government for governmental purposes, without the payment to me of any royalty thereon.

This invention pertains to conveyor equipment and more especially to restraining structure for preventing crating on roller conveyors from rolling off during transportation on a vehicle in which the conveyors are used.

It has been customary in the use of portable roller conveyors installed on trucks to employ chains and other mechanical makeshifts for holding cratings, boxes, and packages loaded in place to prevent their rolling off. These makeshifts have the disadvantage of breaking or becoming dislodged, so as not to function as required in such use. The breaking of such allow the loaded cratings to readily slide down on the rollers and fall off the trucks, frequently with considerable damage thereto and its contents.

It is an object of the present invention to provide a new and improved roller conveyor restraining structure that will avoid one or more of the disadvantages and limitations of the prior art.

Another object of the present invention is to provide a new and improved roller conveyor restraining structure that will be of a portable nature, capable of facile attachment and detachment, offer adequate resistance to the movement of loaded crating thereon, and be positively securable in place.

Still another object of the present invention is to provide a new and improved roller conveyor restraining structure that will enable the roller conveyor to be made as frictionless as feasible, without devaluating the effectiveness of the restraining structure.

A still further object of the present invention is to provide a new and improved restraining structure for a roller conveyor that may be effectively attached and used in any place on the conveyor that it can be placed in.

For a better understanding on the present invention together with other and further objects thereof, reference is had to the following description taken in connection with the accompanying drawings, while the scope of the invention is included in the claims.

Figure 2:
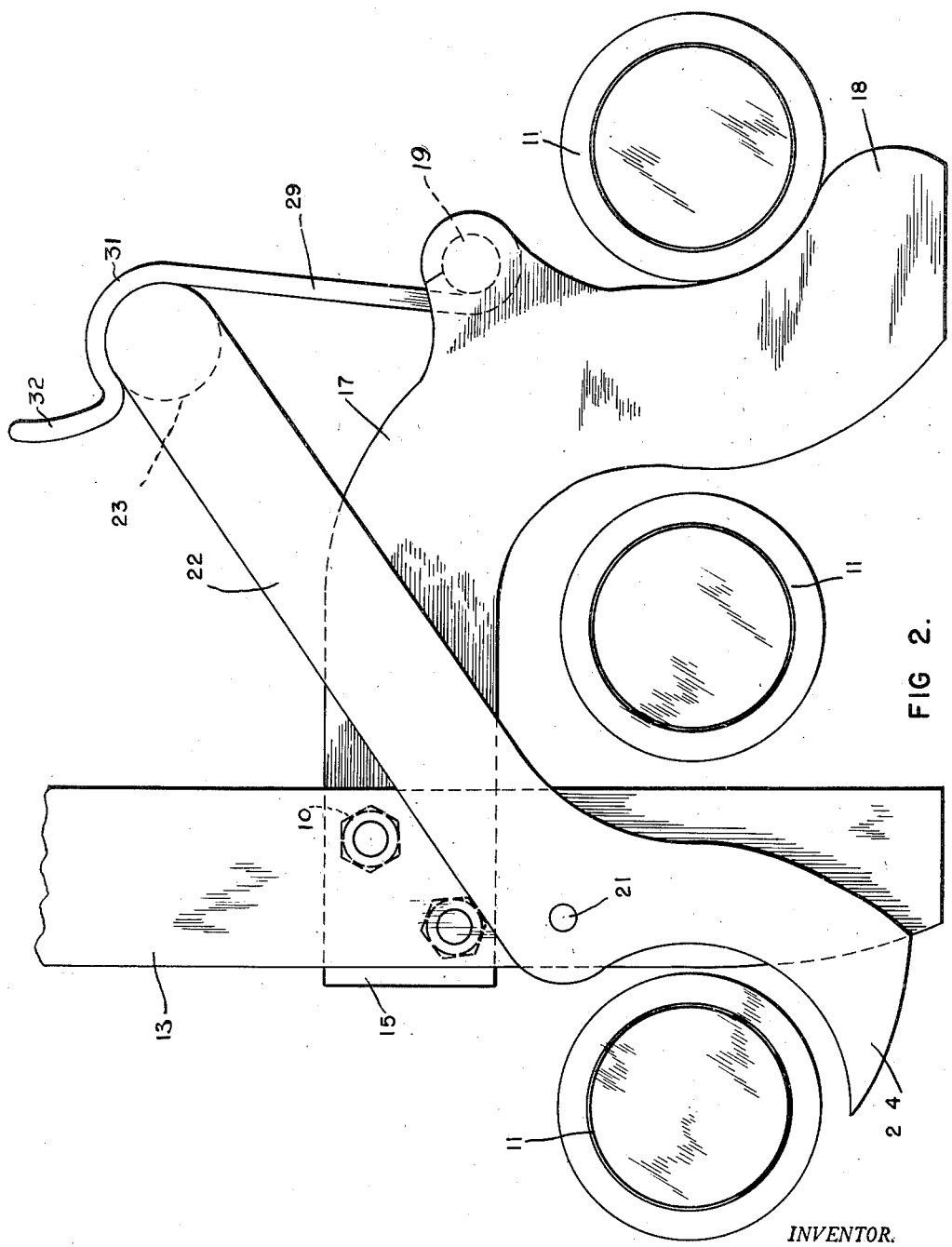

Referring to the drawings:

Figure 1 is a view in perspective of a restraining structure assembled on a roller conveyor, the roller conveyor being shown in dotted outline, and, Figure 2 shows a modified form of catch and mounting for the brace rod used in connection with the frame.

Similar reference characters refer to similar parts throughout the drawings.

Referring to Figure 1, a conventional roller conveyor having cylindrical rollers 11 rotatably mounted transversely between side channels 12 is indicated in dotted outline. The frame of the restraining structure employed in this illustration is slid in between two adjacent rollers 11 so as to cause the engagement of two pairs of its elements intussusceptionally, in opposing direction and erect themselves into a frame-like structure that can be locked into an irremovable form.

The restraining structure comprises an inverted U-like bracket or frame including a horizontal transverse bar 16 at the top with side legs 13 attached and pending down from it. The legs 13 are spaced transversely apart so as to fit snugly between and against the inside surfaces of the side channels 12 and extend to the floor on which the conveyor rests. The side limit pivot pieces 14 are provided in case there is an open space under the conveyor, which might allow the frame to fall through. They prevent the structure from passing through the conveyor, should the legs not rest on the floor of the vehicle carrying the conveyor. An intermediately disposed cross-frame 15 is bolted and rigidly connected with the legs 13. It has arms 17 that project horizontally at right angles to the legs and toward the front of the frame. The arms 17 are formed with pending claws 18 designed to slip under the roller 11 in front and are joined together with a transverse rod 19 rigidly attached thereto. Hinging on pivots 21 secured to the lower portions of the legs 13 are levers 22 having their outer end portions secured by a brace rod 23 to make them fit between the channels 12. Their inner end portions 24 are arcuately formed into offset claws adapted to fit rearwardly under a roller 11, in back of the structure proper, as indicated. The pivots 21 are extended through the legs 13 to form the limit pieces 14.

The rods 19 and 23 are arranged so that they may be brought parallel and close to each other when the structure is mounted properly on the roller conveyor. When in this position, a double-hooked resilient catch 25 placed on the rod 23 near the middle thereof, engages with the rod 19 under it and retains both rods locked against unloosening and swinging open. The extension lugs 26 on the catch facilitate the locking and unlocking of the catch and holding the mechanism formed by the levers 22 and rod to the frame made up of the parts 15 and 18. The double-hooking in opposite directions of this catch 25 provides a hook arrangement that will hold securely whichever direction the rods 19 and 23 may tend to pull, and even should one hook unloosen or detach, the other would not necessarily follow its example. The arms 17 are preferably doubly bolted by bolts 10 to the legs 13 as shown to allow the parts to be knocked-down and closed up more compactly for transportation purposes when the device is not in use. A handle 27 is rigidly secured to the crossbar 16, by welding or otherwise, near the middle thereof on the surface facing forwardly. It is used primarily as a handle for carrying purposes, and secondly, for holding the rod 23 close to the crossbar 16 by locking the catch 25 thereto, when the levers 22 are folded up.

When the device is mounted on the roller conveyor, as indicated in the drawings, its legs 13 and crossbar 16 form a bumper placed close against the boxes or crating 30 loaded on the conveyor. This prevents the boxes or crating 30 from rolling back off the conveyor. The front of the truck is a barrier against movement forward. The pressure of the articles, boxes, or crating against the structure is transmitted through the rigidly held arms 17 to the claws 18. The claws 18 press against and under the roller 11, in front of the device. They cannot lift up past the roller because of their claw forms. Should there be a tendency to tilt the legs 13 and crossbar 16 over toward the front, the movement will cause the levers 22 to exert leverage on the claws 24 to press up against the rear roller 11. The roller will resist such action substantially. Any forward or rearward push on the restraining structure is transmitted against the peripheries of the rollers. The catch 25 serves to solidify the mobile and immobile parts of the frame together as a unit. The structure by reason of its open form has a certain amount of resiliency. The removal of the restraining structure is easily accomplished by releasing the catch 25 from the rod 19, lifting the rod 23 with its levers 22 so the claws 24 will be moved away downwardly from the roller 24. The bracket is then tilted forward sufficiently to allow the claws 18 to get out of line and contact with the front roller 11. Both claws 18 and 24 are then disconnected from the rollers, enabling the whole restraining structure to be lifted off the conveyor by the handle 27. When it is desirable to make the structure more compact when not in use, the rod 23 is held by the catch 25 to the handle 27. Then one of the bolts on each side holding the legs and arms 17 together is removed so the arms may be rotated upwardly on the remaining bolts as pivots to and against the crossbar 16. This enables the frame to be closed into a very compact form and carried conveniently around.

Figure 2 illustrates a modified form of catch. Rod 19 is rigidly positioned in arms 17 in the same manner as in Figure 1. However, levers 22 are mounted on the exterior surfaces of legs 13 rather than on the interior surfaces as in Figure 1. The levers pivot about pivots 21 which now project only from the outer surfaces of legs 13. Pivots 21 project sufficiently to rest on channels 12 and thus serve to prevent the entire structure from passing an excessive distance through the conveyor when legs 13 do not rest on the floor of the structure. Bolts 10 are flush with the exterior surface of legs 13 so as not to impede the movement of levers 22.

Catch 29 consists of a shank having one end bent around the center of rod 19 to pivot around the rod. The other end of the catch is shaped in the form of a hook 31 which is adapted to fit over the center of rod 23 and retain both rods securely and resiliently in spaced relationship. Extension lug 32 facilitates the engaging and disengaging of rod 23 by catch 29. Claws 18 and 24 prevent dislodgement of the structure by forward or rearward thrusts in the same manner as indicated in the description of Figure 1.

While there has been described what is at present considered to be a new and improved embodiment of this invention, it will be noted that various changes and modifications may be made thereon without departing from the principles and spirit of the invention, as sought to be defined in the following claims.

I claim:

1. A restraining structure comprising a U-form bracket having legs spaced to fit within the sides of a roller conveyor and extending as a barrier above same, a cross-frame rigidly mounted on the bracket and extending across same and including claws thereon extending forwardly to contact against the surfaces of a roller of said conveyor, and a movable mechanism mounted on the bracket including claws oppositely positioned to the first mentioned claws to engage another roller of said conveyor.

2. A restraining structure comprising a U-form bracket having legs spaced to fit within the sides of a roller conveyor and extending as a barrier above same, and adapted to limit its insertion therein, a cross-frame rigidly mounted on the bracket and extending transversely across same, claws rigidly mounted on said bracket and extending downwardly and forwardly to contact against the lower surfaces of a roller of said conveyor, a movable mechanism pivotably mounted on the bracket including claws oppositely positioned to the first mentioned claws to engage another roller of said conveyor, and a catch with plural engagement members for securing said bracket and mechanism rigidly in predetermined relationship to each other, whereby said claws are maintained in engagement with said rollers.

3. In a roller conveyor having a plurality of rotary rollers constituting a rollerway, a device for stopping the movement of an article along said rollerway, said device comprising a barrier removably mounted in said device, a first plurality of engaging members rigidly carried by said barrier and extending forwardly thereof to engage one of said rollers, and a second plurality of engaging members pivoted on said barrier and extending rearwardly thereof to engage a second of said rollers.

FORREST LEE GRIFFITH.

REFERENCES CITED

The following references are of record in the file of this patent:

UNITED STATES PATENTS

| Number | Name | Date |
|---|---|---|
| 902,410 | Jackson | Oct. 27, 1908 |
| 984,379 | Levalley | Feb. 14, 1911 |
| 1,325,167 | Olson | Dec. 16, 1919 |
| 1,549,657 | Dunlap | Aug. 11, 1925 |
| 1,669,497 | Steegmuller | May 15, 1928 |
| 2,306,101 | Van Zandt | Dec. 22, 1942 |